(12) United States Patent
Gunderson

(10) Patent No.: US 7,967,342 B2
(45) Date of Patent: Jun. 28, 2011

(54) ANTI-ROTATION QUICK CONNECTOR

(75) Inventor: Stephen H. Gunderson, Marine City, MI (US)

(73) Assignee: TI Group Automotive Systems, LLC, Auburn Hills, MI (US)

( * ) Notice: Subject to any disclaimer, the term of this patent is extended or adjusted under 35 U.S.C. 154(b) by 1078 days.

(21) Appl. No.: 11/358,460

(22) Filed: Feb. 21, 2006

(65) Prior Publication Data

US 2006/0202475 A1 Sep. 14, 2006

Related U.S. Application Data

(60) Provisional application No. 60/657,996, filed on Mar. 1, 2005.

(51) Int. Cl.
 *F16L 39/00* (2006.01)
(52) U.S. Cl. ........................................ 285/319; 285/305
(58) Field of Classification Search .................. 285/305, 285/307, 319, 921
 See application file for complete search history.

(56) References Cited

U.S. PATENT DOCUMENTS

| | | | |
|---|---|---|---|
| 3,606,401 A | 9/1971 | Schwarz | |
| 4,875,709 A * | 10/1989 | Caroll et al. ..................... | 285/14 |
| 5,161,833 A * | 11/1992 | McNaughton et al. ....... | 285/319 |
| 5,257,833 A | 11/1993 | McNaughton | |
| 5,324,082 A | 6/1994 | McNaughton | |
| 5,395,140 A | 3/1995 | Wiethorn | |
| 5,449,848 A | 9/1995 | Itoh | |
| 5,586,792 A | 12/1996 | Kalahasthy | |
| 5,607,190 A * | 3/1997 | Exandier et al. ................ | 285/93 |
| 5,628,531 A | 5/1997 | Rosenberg | |
| 5,863,077 A | 1/1999 | Szabo | |
| 5,992,902 A * | 11/1999 | Knapp .......................... | 285/305 |
| 6,086,118 A | 7/2000 | McNaughton | |
| 6,186,561 B1 * | 2/2001 | Kaishio et al. ................. | 285/319 |
| 6,508,269 B2 * | 1/2003 | Szabo et al. ................ | 137/515.5 |
| 6,601,878 B2 | 8/2003 | Ooi et al. | |
| 6,834,891 B2 * | 12/2004 | Matsubara et al. ........... | 285/319 |
| 6,857,664 B2 * | 2/2005 | Ohlsson ......................... | 285/85 |
| 6,863,314 B2 * | 3/2005 | Guest ............................. | 285/81 |
| 6,905,143 B2 | 6/2005 | Klinger et al. | |
| 2004/0061332 A1 | 4/2004 | Takayanagi et al. | |
| 2004/0108717 A1 * | 6/2004 | Matsubara et al. ........... | 285/330 |

FOREIGN PATENT DOCUMENTS

| | | |
|---|---|---|
| DE | 103 47 928 A1 | 6/2005 |
| JP | 2002-276878 | 9/2002 |
| JP | 2004-144297 | 5/2004 |

OTHER PUBLICATIONS

U.S. Appl. No. 10/814,314, filed Mar. 31, 2004, Pepe.

* cited by examiner

*Primary Examiner* — Aaron Dunwoody
*Assistant Examiner* — Fannie Kee
(74) *Attorney, Agent, or Firm* — Leydig, Voit & Mayer, Ltd.

(57) ABSTRACT

A quick connector coupling assembly comprising a body, a tube, and a retainer to secure the tube in the body. The body defines an internal cavity extending from an opening. The tube has an endform extending through the opening and into the internal cavity. The endform has a tip and an engagement surface. The engagement surface of the endform coacts with a locking surface associated with the body or the retainer to resist rotational movement of the tube relative to the body.

11 Claims, 7 Drawing Sheets

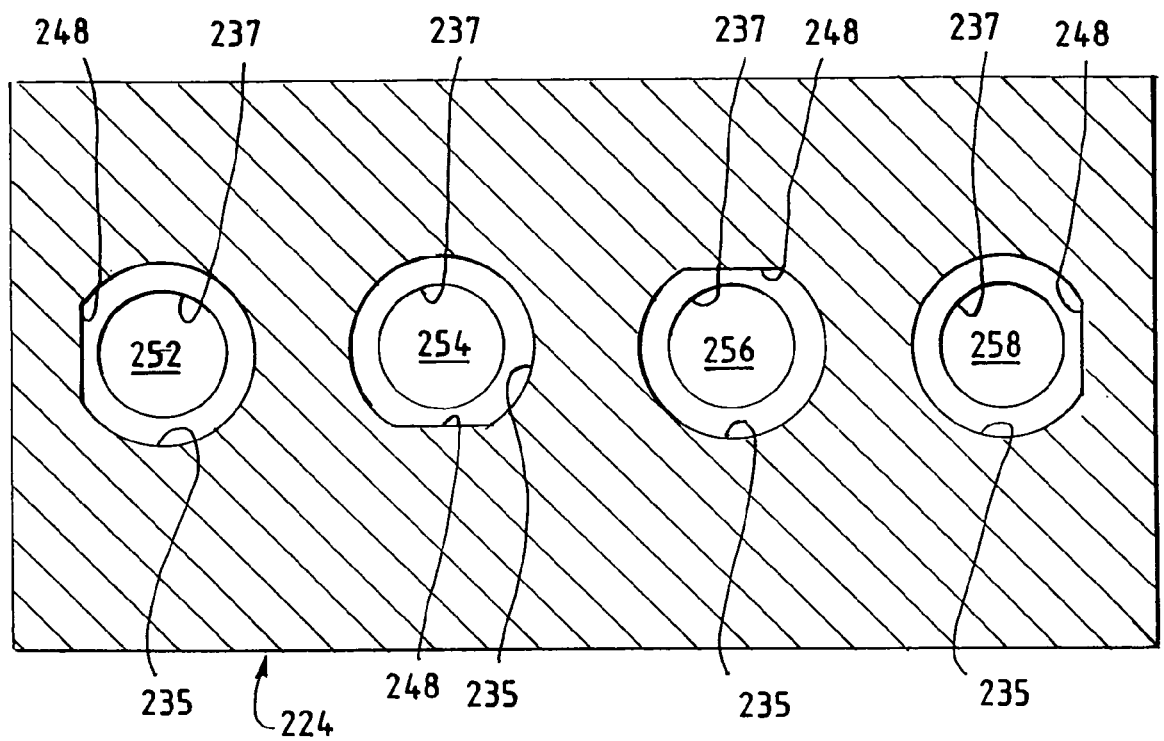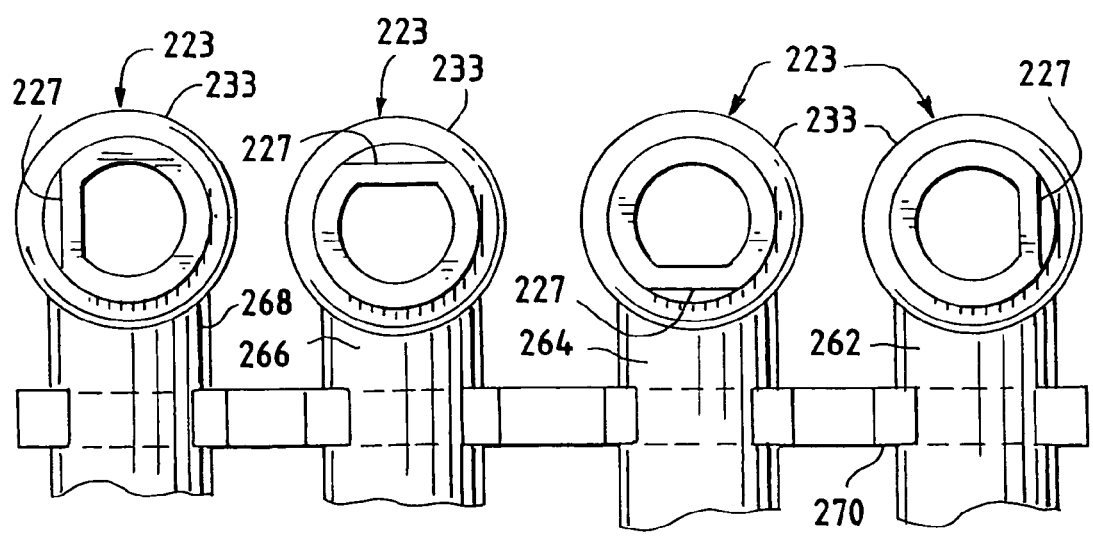

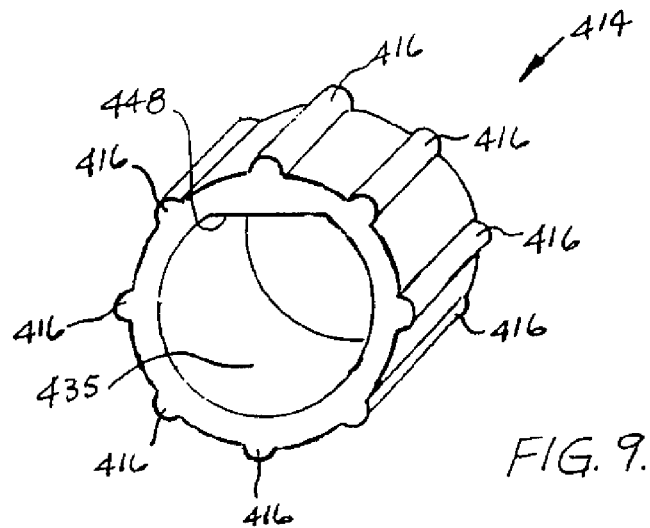
FIG. 9.
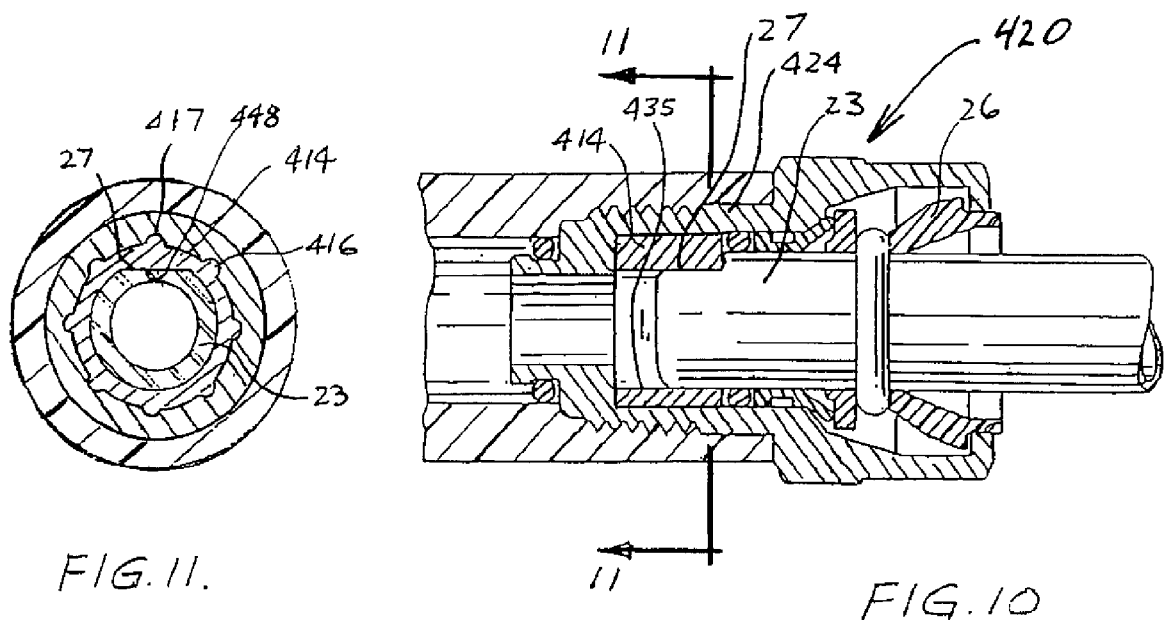
FIG. 11.
FIG. 10

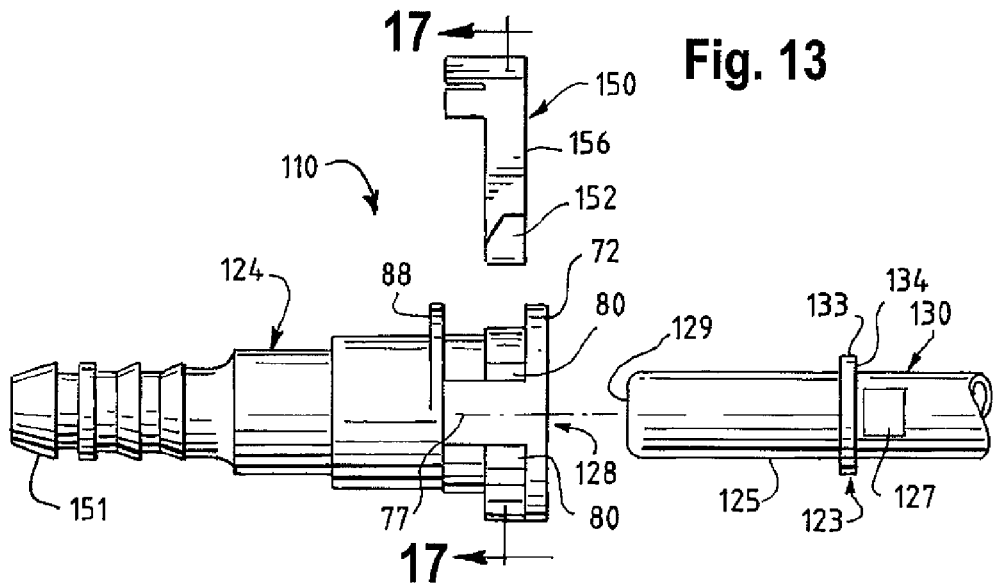
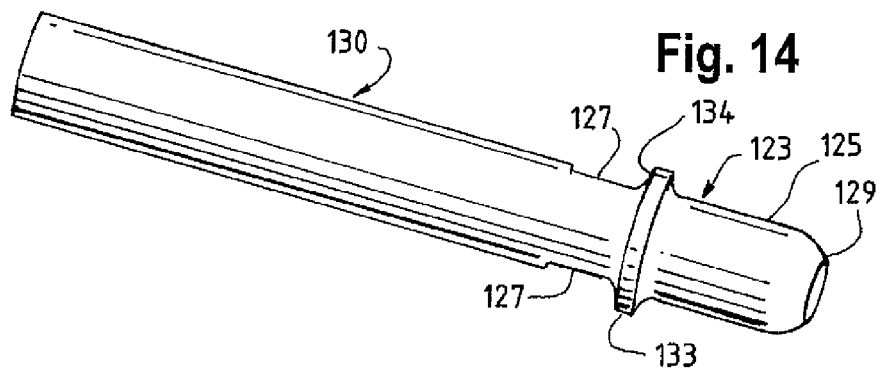
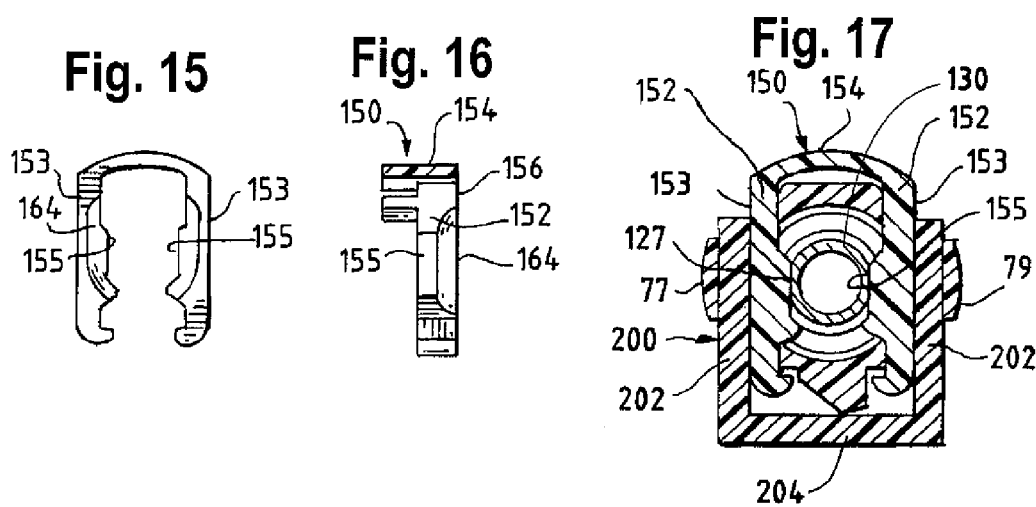

ANTI-ROTATION QUICK CONNECTOR

This application claims the benefits of U.S. Provisional Application No. 60/657,996, filed on Mar. 1, 2005. This invention relates to quick connectors to releasably secure a metal tube in a fluid system. More particularly, it relates to quick connectors that resist rotation of the connected tube.

BACKGROUND OF THE INVENTION

Quick connectors are used to assemble rigid fluid lines or tubes to mating components such as a flexible hose, or a fluid system. The quick connector assembly includes some form of body or housing that defines an open receptacle with internal cylindrical surfaces of varying diameter that coact with the inserted tube.

The tube has a free end portion that mates with the connector body receptacle. A retainer releasably couples the other two components together.

All quick connector endforms allow rotation of the tube relative to the quick connector body. This relative rotational motion may be undesirable in certain applications. With a non-rotating tube, a more robust fluid and vapor (permeation) seal can be maintained.

In one form, this invention provides an endform with a flat on the free end portion of the tube and a coacting flat in the bore of the connector body or housing which coact to keep the relative rotation motion to a minimum.

The endform flat may be positioned anywhere on the endform except at the O-ring sealing location. That surface must be cylindrical to permit the seal surfaces to coact with the O-ring.

In another type of quick connector a locking member is employed that extends perpendicular to the body. It is inserted behind the upset on the tube.

In such a connector assembly, the flat is positioned where the fully engaged quick connect retainer restricts the endform upset. The legs of the locking member contact the flats and reduce relative rotational motion of the endform to the quick connect body.

Another option is to provide a flat on the endform where a verifier or secondary latch adds additional clamping force to the flat to increase the amount of torque required to create relative rotating motion.

The tube in this type of quick connector assembly is provided with flats on opposite sides of the tube adjacent the annular radial surface on the tube upset. The locking arms of the retainer contact the flats to resist rotation. A secondary latch may be employed to prevent the locking arms from spreading apart if rotational force is imparted to the tube.

Past designs for anti-rotation included additional parts such as a clip that snaps over the quick connect body and first bend in the tube nearest the endform portion. The anti-rotation feature of flats on the tube and quick connect body will eliminate the part cost and labor cost of separate clip assembly.

A flat on the nose of the endform solves another problem. Many brake components such as the hydraulic control unit (HCU), anti-lock braking system (ABS) and master cylinder has up to four fluid ports in close proximity to each other on the same plane. Past designs for eliminating tube crossover include machining different size threads into the brake tube nut and receiving bore. Altering thread sizes for each port is costly because it makes uncommon tooling, adds material for the larger thread sizes, increases machining time and decreases batch sizes for brake tube nuts.

Machining or molding a flat inside a fluid tube bore pocket of a body to align with the endform flat of its associated tube can permit many combinations based on the angle of orientation of the flats. This approach can be used to make sure the tube endforms are assembled into the correct receiving port. For example, by rotating the flat at 90 degrees clockwise or counter-clockwise, four separate connection combinations can be achieved.

This approach also takes into account that several flats could be designed in combination to achieve the same anti-rotation and assembly assurances. This pertains to all surface areas of size and shape of the flat or in any combination along the tube in respect to the function of the anti-rotation. Since the tubing is rigid in nature and resists large twisting motions, the flat orientations will make it impossible for the assembly operator to connect into a receiving port that does not have the matching flat orientation. It is possible to increase the number of connections with these features as long as the number of degrees of available tube twist is less than the angle difference between the receiving port flats. A clip may also add to the tube resistance to twisting which may increase number of ports that can be assembled without crossing tubes into the wrong ports.

BRIEF DESCRIPTION OF THE DRAWINGS

FIG. 7 is a sectional view of a fluid system component with multiple ports to receive multiple tubes embodying the principles of the present invention.

FIG. 8 is a frontal plan view of a tube bundle that assembles to the multiple port component of FIG. 7.

FIG. 9 a perspective view of an insert for use in an alternative quick connector coupling assembly embodying the features of the present invention.

FIG. 10 is a sectional view of an alternative quick connector coupling assembly utilizing the insert of FIG. 9.

FIG. 11 is a sectional view of the alternative quick connector coupling of FIG. 10 taken generally along the line 11-11 in FIG. 10.

FIG. 13 is a side view of an alternate form of quick connect coupling assembly embodying the features of the invention.

FIG. 14 is a perspective view of the male tube member of the quick connector coupling assembly of FIG. 13 illustrating the principles of the present invention.

FIGS. 15, and 16 are views of the retainer of the quick connect coupling of the embodiment of FIG. 13 illustrating principles of the present invention.

FIG. 17 is a sectional view of the quick connector coupling of FIG. 13 taken generally along the line 17-17 in FIG. 13.

DETAILED DESCRIPTION

Figure 1:
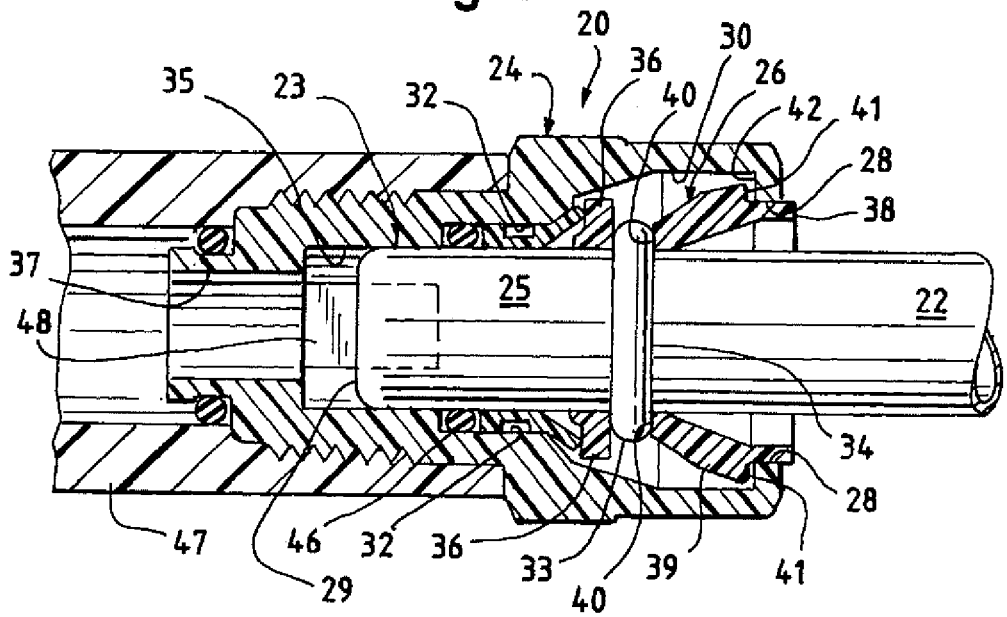
FIG. 1 is a sectional view of a quick connect coupling assembly embodying the principles of the present invention.

FIG. 1 illustrates a quick connector coupling assembly generally designated 20, embodying the principles of the present invention. It includes a fluid tube 22 and a body or housing 24. A retainer 26 provides a releasable connection between the tube 22 of a fluid system and the body 24. The body 24 is illustrated as connected to a flexible hose 47 that represents connection to the remainder of the fluid system. This connector coupling is generally similar to the quick connector disclosed in U.S. Pat. No. 5,161,832 the disclosure of which is hereby incorporated by reference herein.

The invention is suitable to be employed with numerous quick connector coupling arrangements. U.S. Pat. Nos. 5,257,833; 5,324,082; 5,395,140; 5,449,848; 5,628,531; and 6,086,118 are examples of quick connector couplings suitable for employing the invention. It is contemplated that the invention could be employed with numerous other known quick connector coupling arrangements as well.

Tube 22 is a rigid metal tube. It includes an endform area 23 that includes radial upset 33 that defines annular radial locking surface 34, cylindrical sealing surface 25, generally flat planar engagement surface 27, and tip or free end 29. The generally flat planar engagement surface 27 extends from tip or free end 29 toward upset 33 but not the entire distance. The cylindrical sealing surface 25 is located between the upset 33 and the axial terminus of the flat surface 27.

The illustrated connector body or housing 24 is hollow and made of molded plastic. Other materials are also commonly used. Body 24 defines an internal cavity or passage with an entrance opening 28 and four cylindrical surfaces of varying diameter that extend inward respectively from entrance opening 28. These are, a relatively large retainer surface 30, a somewhat smaller cylindrical seal surface 32, a tube end receiving surface 35, and a channel 37 that completes the passage through the body.

Retainer surface 30 receives locking retainer 26. It defines an annular radial locking surface 42.

Sealing surface 32 is somewhat smaller in diameter than retainer surface 30. It is larger in diameter than cylindrical sealing surface 25 of tube endform area 23. An O-ring 46 seals between these surfaces to provide a fluid tight seal.

Tube end receiving surface 35 is sized closely to the outer diameter of cylindrical sealing surface 25 of endform area 23. It receives, and pilots the cylindrical seal surface 25 when the tube endform area 23 is positioned within the body cavity.

Tube end receiving surface 35 is not completely cylindrical. It includes a generally flat planar anti-rotational or locking surface 48 that extends axially toward cylindrical sealing surface 25 and terminates at the transition from the cylindrical tube receiving surface 35 and the cylindrical seal surface 32. It does not extend into the area of the cylindrical seal surface 32.

Retainer 26 is cylindrical and includes forward ring 36 and rear flex ring 38. A plurality of locking arms 39 extend from flex ring 38. Each arm includes a tube contact surface 40 and a body contact surface 41. When endform area 23 of tube 22 is positioned completely within the cavity of body 24, the tube contact surfaces 40 of each arm contacts the radial locking surface 34 of upset 33 and the body contact surface 41 of each thin 39 contacts the annular radial locking surface 42. The interposition of the locking arms retains the tube 22 in the body or housing 24.

To complete a fluid tight coupling between the tube 22 and body 24, the tube endform area 23 is inserted into opening 28. As the tube endform area is moved inward, the upset 33 deflects the locking arms 39 radially outward to permit passage of the tube endform area into the cavity of body 24. The O-ring 46 and associated components are present on the cylindrical sealing surface 25 of endform area 23 and move into position as the tube 22 is inserted.

In accordance with the present invention, the tube 22 is inserted with the generally flat planar engagement surface 27 aligned with the generally flat planar locking surface 48 formed in the otherwise cylindrical tube end receiving surface 35, such that the generally flat planar engagement surface 22 of the tube and the generally flat planar locking surface 48 are disposed in face to face relation. It is only with such orientation between tube endform area 23 and tube end receiving surface 35 that the tube can be completely inserted into the cavity of body 24. Moreover, after complete insertion, the flat planar surface 27 of tube endform area 23 coacts with flat planar surface 48 on otherwise cylindrical tube receiving surface 35 to prevent rotational movement of the tube 22 relative to the body 24.

It should be noted that while the above embodiment discloses a flat planar engagement surface 27 defined on the endform area 23 of the tube 22 which coacts with a corresponding flat planar locking surface 48 defined on the body 24 to prevent rotational movement of the tube 22 relative to the body 24, the present invention is not limited to "flat planar" as the shape of the surfaces defined on the endform and the body which coacts to prevent rotational movement of the tube relative to the body. Rather any shape of the engagement surface defined on the endform of the tube which coacts with a locking surface defined on the body to prevent rotational movement of the tube relative to the body is within the spirit of the present invention.

Figure 4:
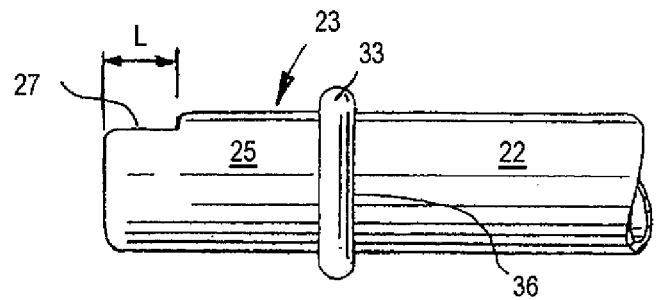
FIG. 4 is a side view of the tube of FIG. 2.
Figure 5:
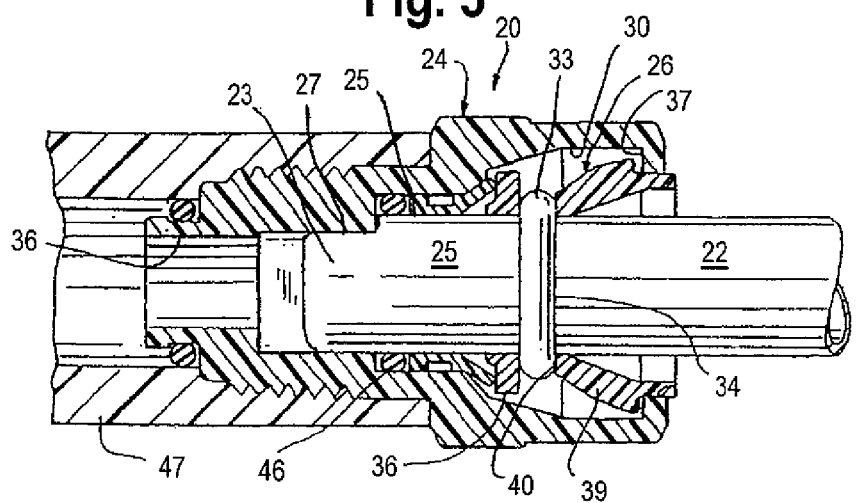
FIG. 5 is a sectional view of the quick connect coupling assembly of FIG. 1 taken through the flat of the tube.
Figure 6:
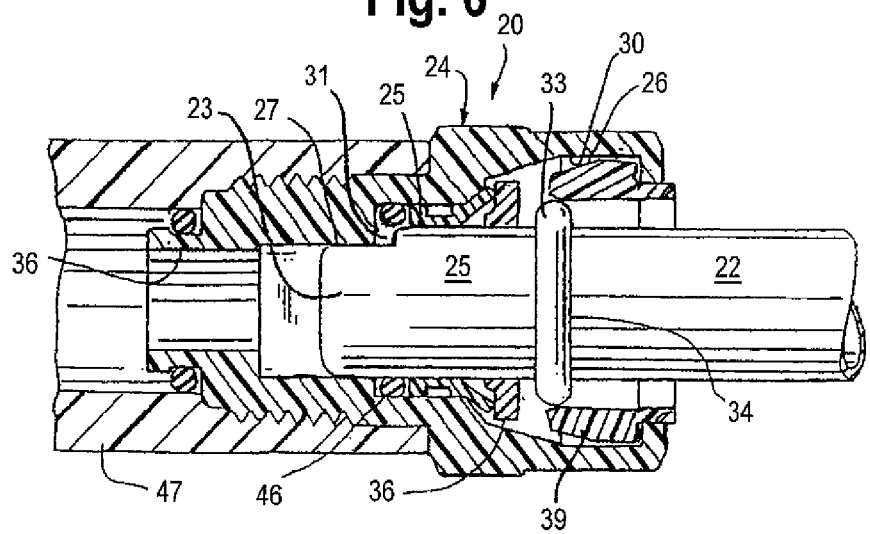
FIG. 6 is a sectional view of the quick connect coupling assembly of FIG. 1 with the tube not completely inserted into the body.

Another feature of the quick connector assembly 20 of the invention is that a leak test, commonly conducted by the original equipment manufacturer (OEM) after the quick connector assembly has been assembled, will be able to assure that the quick connector assembly 20 has been completely assembled such that the tube contact surfaces 40 of the arms 39 are in abutting relationship with the radial locking surface 34 of the upset 33. As illustrated in FIG. 4, the flat planar surface 27 defined on the endform area 23 has a length L. The length L of the flat planar surface 27 should be sized such that if the quick connector assembly 20 has been completely assembled, as illustrated in FIG. 5, the O-ring 46 is not situated radially outward of the flat planar surface 27. Rather, if the quick connector assembly 20 has been completely assembled, the O-ring 46 is situated directly radially outward of the cylindrical sealing surface 25. FIG. 6 illustrates a situation in which the quick connector assembly 20 of the invention has not been completely assembled such that the endform area 23 has not been sufficiently inserted into the cavity body 24 to allow the upset 33 of the endform area 23 to surpass the arms 39 of the retainer 26. If the quick connector assembly has not been completely assembled, the O-ring is situated directly radially outward of the flat planar surface 27. Since the flat planar surface 27 is recessed radially inward from the cylindrical seal surface 25 for which the O-ring 46 would have been situated on if the quick connector assembly 20 was completely assembled, a space or flow path 31 is defined between the O-ring 46 and flat planar surface 27 of the endform area 23. This flow path 31 allows fluid leak to occur in the event that the quick connector assembly 20 has not been completely assembled.

FIG. 7 is illustrative of another important feature of the invention. Illustrated is a fluid system component, such as a brake system component or body generally designated 224 made of metal as illustrated. It could be an anti-lock brake system component, a master cylinder, or hydraulic control center. It could be a component of any other fluid system where multiple connections of rigid tubes are made to a single body.

Body 224 includes four cavities, bores or ports 252, 254, 256, and 258. Each cavity is a tube receiving receptacle such as the internal cavity of body 24 of FIGS. 1 to 6. Each receptacle includes the four cylindrical surfaces of varying diameter. The inner most is a channel 237 such as channel 37 of the embodiment of FIGS. 1-6. Each leads to a branch of the fluid system of which the body 224 is a port. The next bore is a tube end receiving surface 235 such as the tube end receiving surface 35 of the body 24 of FIGS. 1 to 6. A cylindrical seal surface corresponds to the seal receiving surface 32 of the first embodiment and a large retainer receiving surface is the same as the retainer receiving surface 30 of the embodiments of FIGS. 1 to 6. These latter two cylindrical surfaces are not illustrated because the body 224 is shown in cross section taken through the cylindrical tube receiving surfaces 235.

Each tube receiving surface 235 includes a generally flat planar locking surface 248. Each flat planar locking surface 248 is positioned at a different location about its associated cylindrical tube receiving surface 235. In port 252 the flat planar locking surface 248 is vertical at the left side of the port. In port 254 the flat planar locking surface 248 is horizontal at the bottom of the port. In port 256, the flat planar locking surface 248 is horizontal at the top of the port, and in port 258 the flat planar locking surface is vertical on the right side of the port.

Figure 2:
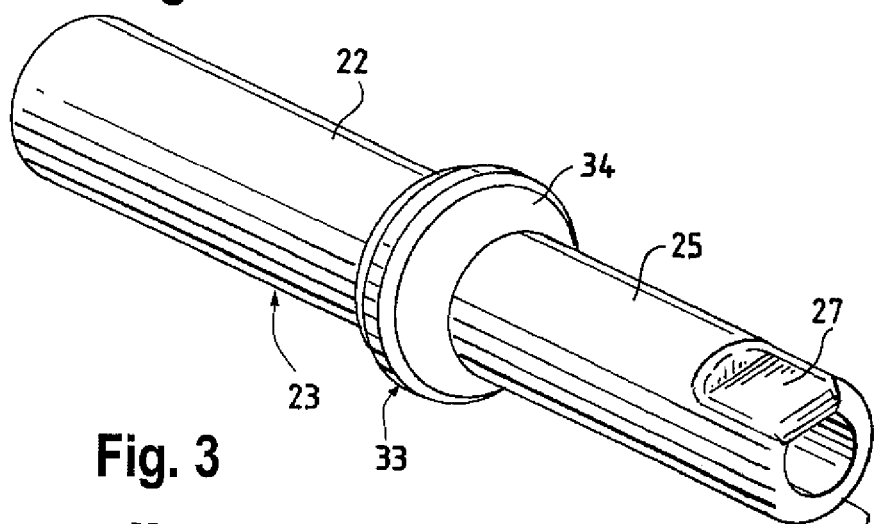
FIG. 2 is a perspective view of a tube for the quick connector assembly of FIG. 1 with an endform embodying the principles of the present invention.
Figure 3:
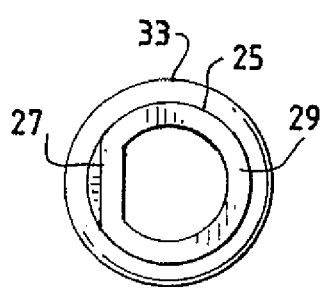
FIG. 3 is a front view of the tube of FIG. 2.

Each port is intended to coact with a tube such as tube 22 of FIG. 2. Thus, four separate tubes are connected to the component or body 224. The tubes associated with the multiple port component 224 are orientated such that they could be inserted into only one port.

A tubing bundle shown in FIG. 8 illustrates this relationship. Four tubes are shown, tube 262, 264, 266, and 268, each with an endform area generally designated 223. The tubes are secured together by clip 270. Each endform area includes an upset 233, to lock into one of the ports 252, 254, 256, and 258. Each endform area has a planar flat engagement surface 227 orientated such that it aligns with the flat planar surface 248 of its associated port. On assembly, tube 262 can only be inserted into port 252, tube 264 can only be inserted into port 254, tube 266 can only be inserted into port 256 and tube 268 can only be inserted into port 258.

In the embodiment illustrated flat planar locking surfaces 248 coact with the flat engagement surfaces formed on the tubes. However, these alignment elements need not be flats as disclosed. For example, tube receiving cylindrical surfaces 235 could be fully formed as cylindrical. Pins or other elements could then be inserted transverse to the bores at the appropriate locations. The tubes could then only be inserted when the flat planar surfaces 227 were aligned with the locations of the pins or other inserted element. It should also be noted that in connection with the embodiment of FIGS. 1-6 the flat planar surface 48 associated with body 24 need not be molded into cylindrical tube receiving surface 35. That surface could be formed as a cylinder. The anti-rotation feature could be provided by an insert that would be non-rotatable relative to the body 24 and would overlie the cylindrical tube receiving surface 35 at the appropriate location.

Rather than defining a flat planar locking surface 48 directly on the body 24 or defining a flat planar locking surface 248 on the body 224 as illustrated in the above embodiments, a locking surface 448 can also be defined on an insert 414 as illustrated in FIG. 9-12. The insert 414 includes eight approximately equally spaced radially extending protrusions 416. As illustrated in FIGS. 10 and 11, an alternative quick connector assembly 420 of the invention includes an endform area 23, a retainer 26, a body 424, and an insert 414. The body or housing 424 defines eight approximately equally spaced notches 417. The insert 414 is inserted into the body 424 with the protrusions 416 aligned with the notches 417. After the insert 414 has been completely inserted into the body 424, the protrusions 416 of the insert 414 coacts with the notches 417 of body 424 to resist rotational movement of the insert 414 relative to the body 424. The insert 414 is hollow and defines a tube receiving surface 435. The tube receiving surface 435 includes a flat planar locking surface 448. Similar to the quick connector coupling assembly 20, the flat planar engagement surface 27 of the tube endform area 23 coacts the flat planar locking surface 448 to prevent rotational movement of the tube relative to the body 424.

An advantage of defining a locking surface, such as the flat planar locking surface 448, on an insert 414 rather than defining the locking surface directly on the body or housing is that various shapes of locking surfaces associated with the body can be used in conjunction with a common body or housing 424. As discussed previously, the engagement surface defined on the endform area 23 and the locking surface defined on the body need not have a "flat planar" shape. Therefore, if a variety of shapes are used for the engagement surface defined on the endform area 23, a variety of shapes for the locking surface associated with the body are necessary for the two surfaces to coact. By using an insert in accordance to the present invention, a common body 424 can be used even if there exists a variety of shapes for the engagement surface defined on the endform area. Inserts with the same external shape including protrusions 416 can be made with the desired internal configuration necessary to coact with the tube endform.

Figure 12:
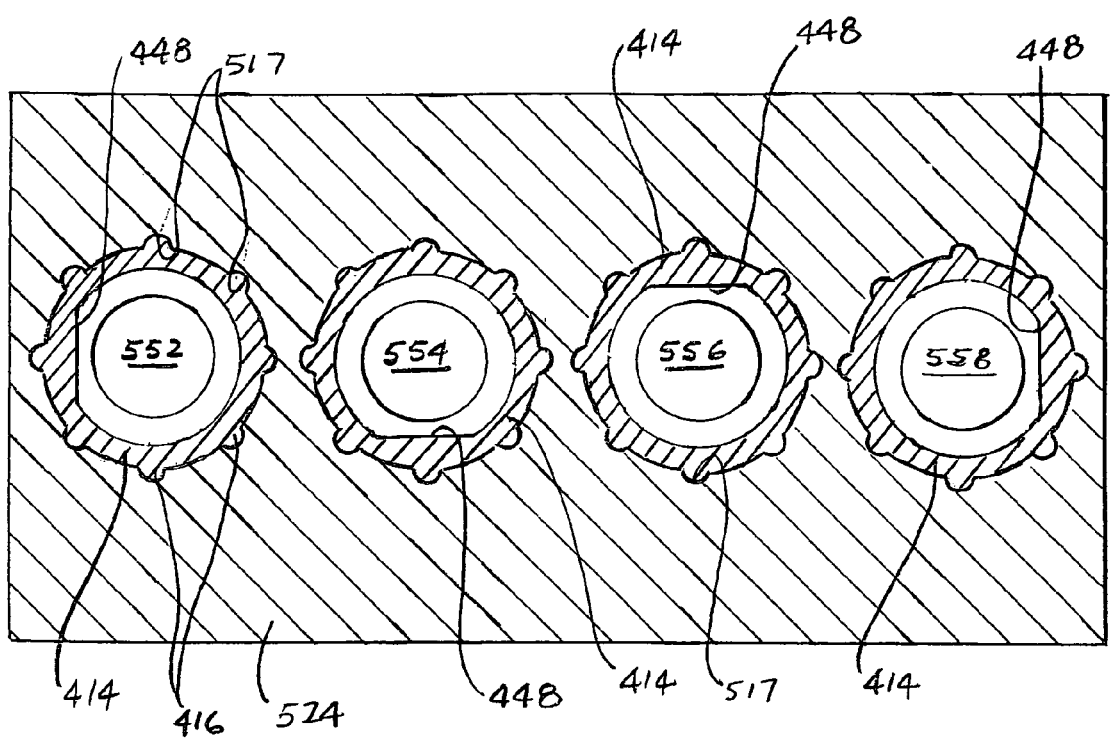
FIG. 12 is a sectional view of an alternative fluid system component with multiple ports to receive multiple tubes embodying the principles of the present invention using inserts such as shown in FIG. 9.

A body or housing 524 which includes four cavities 552, 554, 556, and 558 is illustrated in FIG. 12. The body 524 is similar to the body 224 with the exception that the flat planar locking surfaces 448 associated with the body 524 are defined on inserts 414 rather than on the body 524. Each cavity 552, 554, 556, and 558 includes eight equally spaced notches 517. An insert 414 is inserted into each of the cavity 552, 554, 556, and 558 with the protrusions 416 aligned with the notches 517 of the corresponding cavity 552, 554, 556, and 558. After the insert 414 has been completely inserted into the corresponding cavity 552, 554, 556, and 558, the protrusions 416 of the insert 414 coact with the corresponding notches 517 to resist rotational movement of the insert 414 relative to the body 524. Since the flat planar locking surfaces 448 associated with the body 524 are defined on the inserts 414, the four flat planar locking surfaces 448 associated with the body 524 can be oriented such that they are aligned with the flat planar engagement surfaces 227 of the corresponding endforms illustrated in FIG. 5, while using a body 524 defining four commonly shaped cavities 552, 554, 556, 558 and four identical inserts 414 inserted into the cavities. Such an arrangement of a quick connector assembly greatly reduces complexity required to accommodate for various orientations of the flat planar engagement surfaces of the endforms by merely changing the orientation of each insert being inserted into the cavity of the body.

A further embodiment of the invention is illustrated in FIGS. 13 through 17. The quick connector coupling assembly 110 shown in FIG. 13 utilizes a transverse retainer element that is applied externally of the body to secure the tube in the connector body. It is often referred to as a "horseshoe" or "hairpin" because of its general "U" shape. The tube of the assembly, illustrated in FIG. 13 is modified to incorporate the invention.

The connector assembly of FIG. 13 is similar to the connector disclosed in U.S. Pat. No. 5,586,792, the disclosure of which is hereby incorporated by reference herein. It is also contemplated that other "horseshoe" type connectors are suitable for incorporation of the invention. Such other connectors include connector couplings with a transverse, externally applied, generally "U" shaped retainer. U.S. Pat. No. 5,863,077 and pending U.S. patent application Ser. No. 10/104,405 published Sep. 25, 2003 as Publication No. US 2003/0178844 A1 are examples.

Quick connector coupling assembly generally designated 110 includes a body or housing 124, tube 130 and retainer 150. Body 124 defines an internal cavity defined by cylindrical surfaces similar to the body 24 of FIGS. 1 and 5. The cavity is a hollow passage from a tube receiving opening 128 to a channel in stem end 151. Stem end 151 is adapted to connect to a hose of the fluid system (not shown).

Body 124 includes apertures 80 on opposite sides of the body open to the internal cavity to expose the exterior surface of tube 130 inserted through entrance opening 128. Transverse ridges 72 and 88 are formed on the outer surface of the body 124. Webs 77 and 79, seen in FIGS. 13 and 17 with parallel surfaces, extend between the ridges 72 and 88 and overlie the apertures 80.

Tube 130 includes endform portion 123 with a free end or tip 129 and a radial upset 133 spaced from the tip. The upset defines an annular radial locking surface 134. The endform portion 123 has a cylindrical sealing surface 125. In this embodiment a pair of planar flat engagement surfaces 127 are provided on opposite sides of tube 130 adjacent the radial locking surface 134 on upset 133. These flats are best seen in FIGS. 13, 14 and 17. The flats are intended to be positioned to be parallel to inner surfaces of webs 77 and 79.

Retainer 150 is generally "U" shaped. It is molded of plastic. Though rigid it possesses some flexibility. Retainer 150 includes a pair of elongated generally parallel locking beams 152 joined at one end by cross member 154. The retainer defines transverse flat planar surface 156. The beams have outer parallel surfaces 153 and facing flat locking surfaces 155 which are spaced apart generally the same distance as the flats 127 on the outer diameter of tube 130.

The locking beams are sized to fit within the apertures 80 on either side of body 124. As best seen in FIG. 13, a flat surface is adopted to rest against ridge 72 of body 124 once the retainer 150 is fully inserted. There is some clearance between outer surfaces 153 of the beams and webs 77 and 79 of body 124.

As seen in FIG. 15, the locking beams have shaped lead areas 164 that face the opening 128 in body 124. These areas engage with the free end or tip 129 of tube 130 on its insertion. Cross members 154 flex such that beams 153 move apart to permit the upset 133 to move beyond the beams. The beams are thus positioned between the annular radial locking surface 134 of the upset 133 on tube 130 and the transverse ridge 72 of body 124. The ridge 72 contacts the flat planar surface 156 on retainer 150 to prevent movement of the retainer axially.

In accordance with the invention when tube 130 is fully inserted into body 124 the facing flat locking surfaces 155 of beams 152 contact planar flat engagement surfaces 127 on tube 130. This coaction resists rotational movement of tube 130 relative to body 124.

As best illustrated in FIG. 17, the anti-rotation resistance of the quick connector coupling 110 is significantly increased with the addition of a secondary latch member 200. This latch member is generally "U" shaped and includes legs 202 connected at one end by cross bar 204 after connection of tube 130 to body 124, legs 202 are inserted into apertures 80 radially outward of beams 152. The legs 202 are sized to fill the space between the outer surfaces of locking beams 152 and webs 77 and 79 on body 124. When so positioned, the locking beams 152 are precluded from flexing outward within apertures 80 toward webs 77 and 79. This ensures contact between internal flat locking surfaces 155 of beams 152 with planar flat engagement surfaces 127 on tube 130. Forces due to rotational torque imparted to tube 130 urging locking beams 152 outward are effectively resisted.

It is contemplated that the arrangement of the connector coupling illustrated in FIG. 13-17 is suitable for use in the quick connector coupling disclosed in pending application for U.S. patent Ser. No. 10/814,314, filed Mar. 31, 2004. The specification and drawings of that application are incorporated by reference herein.

Figure 18:
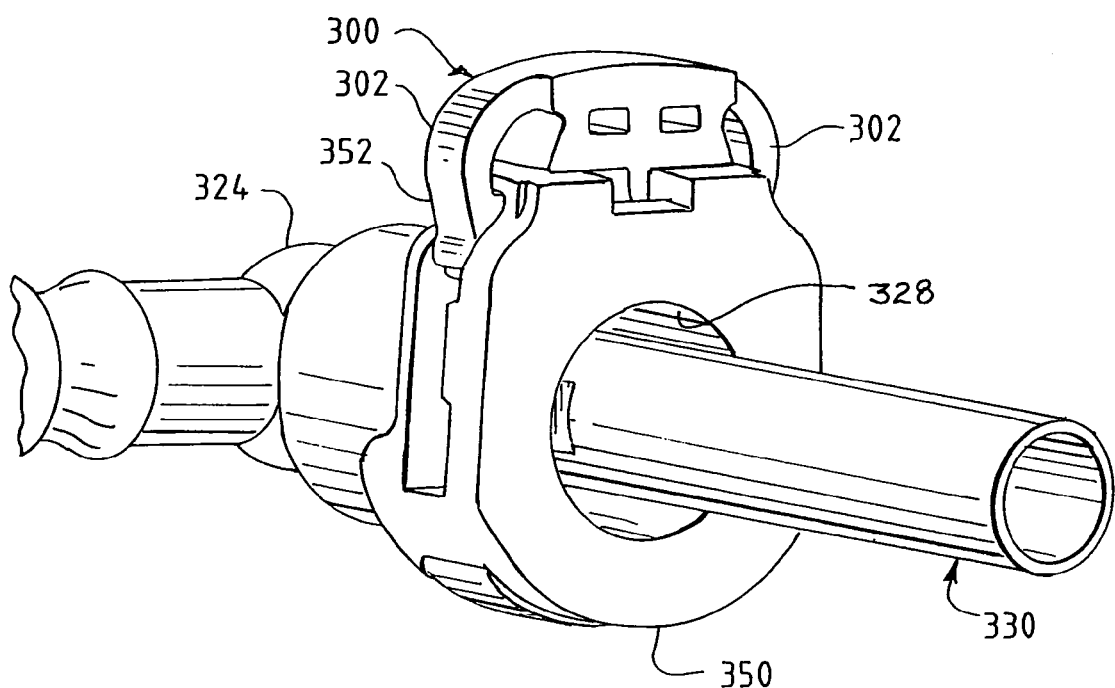
FIG. 18 is a perspective view of another type of quick connector coupling assembly that utilizes an externally applied retainer illustrating principles of the present invention.
Figure 19:
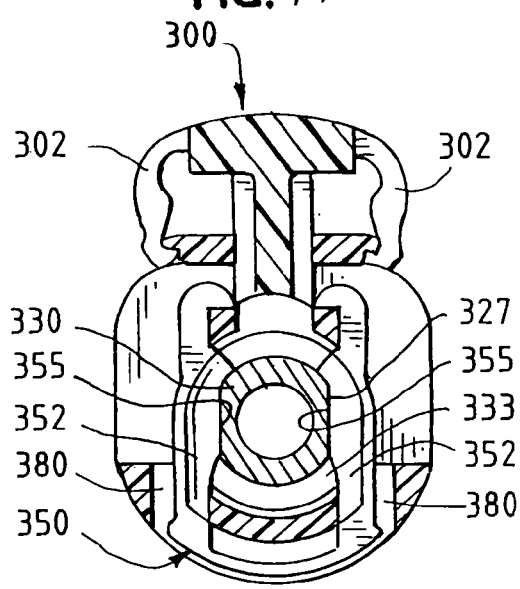
FIGS. 19 and 20 are cross sectional views of the quick connector coupling of FIG. 18.
Figure 20:
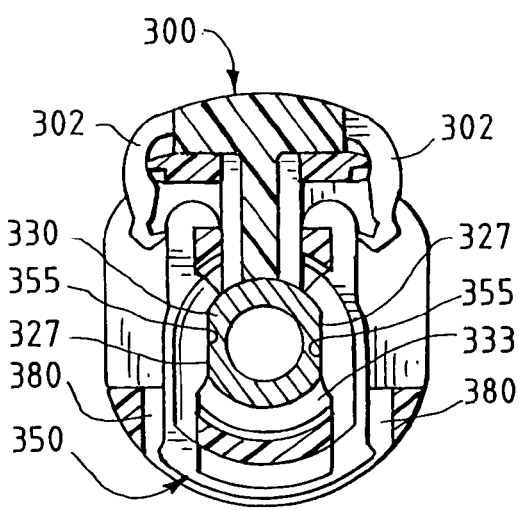

FIG. 18 of this application is a perspective depiction of such an arrangement used in conjunction with a tube 330 such as tube 130 of FIG. 13 and a connector body 324. FIGS. 19 and 20 show cross sectional views through the connector coupling at the position of the retainer which is positioned between the tube upset 333 and the entrance opening 328 of the body 324. The tube 330 includes planar flat engagement surfaces 327 on opposite sides of the tube as in the embodiment of FIG. 14.

Retainer 350 employed in the coupling assembly of FIG. 18 is generally "U" shaped. It includes locking beams 352 with facing flat locking surfaces 355 such as the facing flat locking surfaces 155 of the retainer of the embodiment of FIG. 13-17. With the beams 352 of retainer 350 inserted into the apertures 380 on either side of connector body 324, the facing flat locking surfaces 355 on the beams 352 contact planar flat engagement surfaces 327 on the opposite sides of tube 330. These facing flat surfaces coact to reset rotation of the tube.

A "U" shaped secondary latch member 300 with legs 302 inserts into openings 380 from the opposite end. The legs overlie the locking beams 352 to prevent outward movement of beams 352 relative to the tube 330. This arrangement maximizes resistance against rotation of tube 330 relative to the body 324.

Various features of the present invention have been described with reference to the above illustrative embodiments. It should be understood that modifications may be made without departing from the spirit and scope of the invention as represented by the following claims.

I claim:

1. A quick connector coupling assembly comprising:
   a body defining an internal passage extending from an entrance opening, said passage having a cylindrical sealing surface;
   a tube extending through said entrance opening, said tube having a free end disposed in said passage, a radial upset spaced from said free end, an engagement surface and a cylindrical sealing surface;

a seal element disposed between said cylindrical sealing surface of said passage of said body and said cylindrical sealing surface of said tube providing a fluid tight seal;

a retainer within said body securing said tube in said body; and a hollow insert disposed within said body, secured against rotation relative thereto;

said insert including a tube receiving surface surrounding said tube and a locking surface engaging said engagement surface of said tube preventing rotation of said tube relative to said body.

2. The quick connector coupling assembly as claimed in claim 1 further comprising a flexible hose, said body being connected to said flexible hose.

3. A quick connector coupling assembly comprising:

a body defining an internal passage extending from an entrance opening;

a tube extending through said entrance opening, said tube having a free end disposed in said passage, a radial upset spaced from said free end, and an engagement surface;

a retainer within said body securing said tube in said body; and a hollow insert disposed within said body, secured against rotation relative thereto;

said insert including a tube receiving surface surrounding said tube and a locking surface engaging said engagement surface of said tube preventing rotation of said tube relative to said body;

wherein said insert includes at least one radially outward extending protrusion, and said body includes at least one notch, said at least one radially outward extending protrusion on said insert coacting with said at least one notch in said body to resist rotational movement of said insert relative to said body to render said insert non-rotatable relative to said body.

4. The quick connector coupling as claimed in claim 3 wherein said insert includes a plurality of radially outward extending protrusions and said body includes a plurality of notches.

5. The quick connector coupling assembly as claimed in claim 4 wherein said tube defines a cylindrical sealing surface and said body defines a cylindrical sealing surface and said coupling further comprises an O-ring between said cylindrical sealing surface of said tube and said cylindrical sealing surface of said body.

6. The quick connector coupling as claimed in claim 5 wherein said body defines an annular radial locking surface and said upset on said tube defines an annular radial locking surface, said retainer including a ring with a plurality of locking arms extending from said ring, each locking arm including a tube contact surface and a body contact surface, said tube contact surface being in abutting relationship with said annular radial locking surface of said upset and said body contact surface being in abutting relationship with said annular radial locking surface of said body.

7. The quick connector coupling assembly as claimed in claim 3 wherein said engagement surface on said tube is an axial, generally flat planar surface and said locking surface on said insert is an axial, generally flat planar surface, with said surfaces disposed in face-to-face relation.

8. The quick connector coupling as claimed in claim 3 wherein said passage in said body defines a retainer surface adjacent said entrance opening, a cylindrical sealing surface adjacent said retainer surface and an insert receiving surface adjacent said cylindrical sealing surface, said insert being disposed in said insert receiving surface of said passage in said body, said tube receiving surface of said insert including said locking surface, and said engagement surface of said tube extending from said free end toward said upset, and said free end of said tube being disposed in said tube receiving surface of said insert with said engagement surface of said tube coacting with said locking surface of said insert.

9. The quick connector coupling assembly as claimed in claim 8 wherein said tube defines a cylindrical sealing surface and said coupling further comprises an O-ring situated between said cylindrical sealing surface of said tube and said cylindrical sealing surface of said body.

10. The quick connector coupling assembly as claimed in claim 3 wherein said body is made of molded plastic.

11. The quick connector coupling assembly as claimed in claim 10 wherein said tube is made of metal.

* * * * *